Aug. 28, 1962     L. V. WILSON, JR     3,050,953
SEPARATION BY CRYSTALLIZATION
Filed Oct. 5, 1960
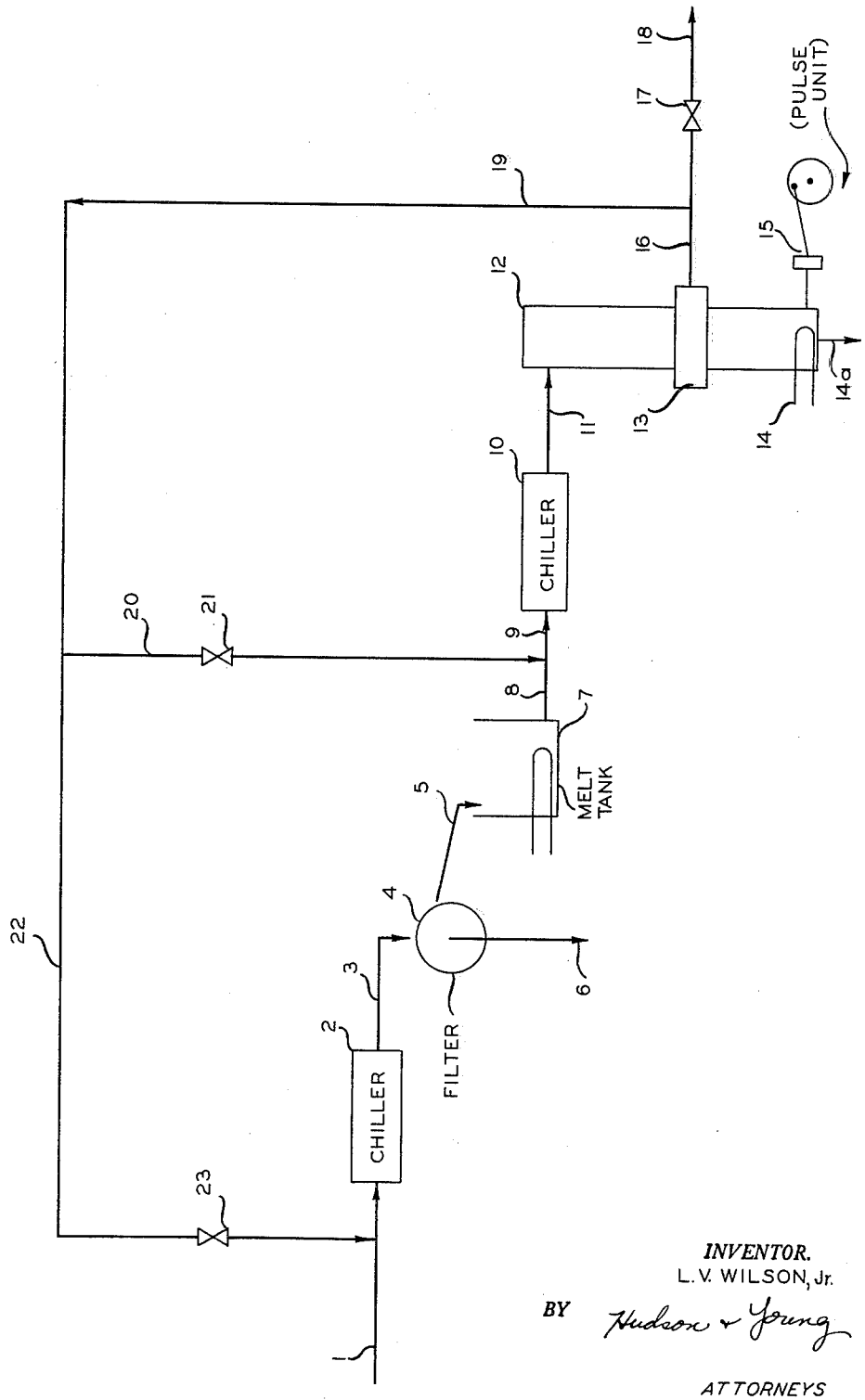
INVENTOR.
L. V. WILSON, Jr.
BY *Hudson + Young*
ATTORNEYS United States Patent Office 3,050,953
Patented Aug. 28, 1962

3,050,953
SEPARATION BY CRYSTALLIZATION
Lawrence V. Wilson, Jr., Bartlesville, Okla., assignor to Phillips Petroleum Company, a corporation of Delaware
Filed Oct. 5, 1960, Ser. No. 60,672
10 Claims. (Cl. 62—58)

This invention relates to separation by crystallization. In one of its aspects, it relates to a process for separating a plurality of liquids by fractional crystallization. In another aspect, it relates to apparatus suitable for separation of a plurality of liquids by fractional crystallization.

Purification by means of fractional crystallization has been known for a number of years. Reissue Patent 23,810, Schmidt (1954), discloses and claims a process and apparatus for purifying crystals, which process involves moving a mixture of crystals and adhering liquid through a liquid removal zone, a reflux zone, and a melting zone, removing liquid in said liquid removal zone, melting crystals in said melting zone, withdrawing part of the melt as product and forcing another part of the melt in a direction countercurrent to the movement of crystals in said reflux zone. This process is generally applicable to the separation of at least one pure component from any mixture which is resolvable into its components by fractional crystallization. For example, the process can be used for the concentration of fruit juices, vegetable juices, and other materials which comprise aqueous solutions which can be concentrated by the formation and removal of ice crystals. The process is also of great value in the resolution of non-aqueous mixtures, an example of such an application being the separation of para-xylene from a mixture thereof with the other xylene isomers and ethylbenzene.

More recently, there has been proposed a process and apparatus for effecting a separation of the type described at higher throughput rates, improved stability and ease of operation, and improved heat distribution. In addition, products of high purity are obtainable over long periods of operation. In accordance with this process, in a process wherein solids are countercurrently contacted with a reflux liquid in a purification zone, the solids in said zone are contacted with an intermittent flow of reflux liquid simultaneously with the propulsion of the solids through said zone. This process is disclosed and claimed in U.S. Patent 2,854,494, issued to R. W. Thomas on September 30, 1956, and the disclosure of this patent is incorporated herein by reference thereto.

When employing the crystallization apparatus abovementioned, difficulties are occasionally encountered in achieving a stable operating condition over a long period of time. One manifestation of the problem is a plugging of the column. This can probably be explained in the following manner. Crystal size of the component frozen out increases with increasing concentration of that component in the feed. The filtration rates are such that it is very easy to remove too much mother liquor in the filter section of the crystallization column. This leaves the bed too dry in this section of the column and makes it extremely difficult to move to the purification section. The band of stable operation is so narrow that it is not possible to control the exact amount of filtration and still leave the bed fluid enough to be moved into the purification section; thus, the bed hangs in the upper section of the column. Since the bed will not move to the heat, the heat travels upward to the bed. This results in operation of the purification section at an elevated temperature and leads to channeling. Also, with higher purity feedstocks, the crystals leave the chiller at a warmer temperature to produce the same amount of solids than at a lower level of component to be frozen. This means that there is a lower amount of refreezing at the product end of the column and hence more voids in the bed. (The refreezing ratio is defined as the pounds of product frozen at the product end of the column required to furnish sufficient heat to raise one pound of solids in the slurry from the chiller outlet temperature to the melting point of the product.) The lower amount of refreezing leaving voids in the bed has three effects; (1) a net loss of energy available for refluxing the bed, (2) less energy available for moving bed from filter section to the heater, and (3) a chance for mother liquor to channel through to the product end of the column.

I have now discovered that these problems can be remedied by maintaining the concentration in the feed of the component to be frozen below a predetermined maximum. This is in sharp contrast to the usual concept of crystal purification, viz. that a higher concentration in the feed of product to be frozen will lead to greater product purity at a given throughput or to greater throughput at a given product purity. I have further discovered that the feed concentration can readily be maintained at or below the desired purity level by returning a portion of the column mother liquor to the column feed-stream.

I have discovered further than this maximum differs from one system of components to another.

It is an object of this invention to provide a method for fractionally separating a plurality of liquids by crystallization. Another object of this invention is to provide for fractional crystallization of liquids with improved stability of operation. A further object of this invention is to provide an improved apparatus suitable for fractional crystallization of a liquid mixture. Still another object of this invention is to provide improved process and apparatus for fractionally separating a liquid mixture using a fractional crystallization column apparatus.

Other aspects, objects, and the several advantages of this invention will be apparent from a study of this disclosure, drawing, and the appended claims.

According to my invention, a fractional crystallization column is operated with a predetermined maximum concentration of component to be frozen in its feed. This is accomplished by recycling at least a portion of the mother liquor from the column to the column feedstream. The recycled mother liquor is preferably introduced to the column feed at a point upstream of the chilling operation which precedes the column. The portion of mother liquor recycled should be, of course, sufficient to maintain the column feed below the predetermined purity. Any remaining mother liquor can be returned at a point further upstream, e.g., to the initial feed of the process, or can be withdrawn as a product of the process.

In the drawing, I have shown a two-stage separation process.

Referring now to the drawing, the operation will be described as applied to separation of methylvinylpyridine (MVP) from a mixture containing it and methylethylpyridine (MEP). The mixture of MVP and MEP is fed by means of conduit 1 to chiller 2. Here, the stream is cooled until a portion of the MVP therein is frozen. The resulting slurry of solids in liquid is passed by conduit 3 to separator 4, which is shown as a filter. This separator can be a centrifuge, decantation tank or other apparatus suitable for solid-liquid separation. Separated liquid is withdrawn by conduit 6 for further utility. Solids, now more concentrated in MVP, are passed by conduit 5 to a melting tank 7 wherein they are at least partially melted by application of heat. The resulting stream is passed by conduits 8 and 9 to a second chiller 10, wherein it is cooled to a higher temperature than in chiller 2, resulting in a partial freezing. This resulting slurry is passed by conduit 11 to fractional crystallization apparatus 12. This apparatus can suitably be the type disclosed by Reissue Patent 23,810 or by Patent 2,854,494, although the latter is preferred by me and shown in the drawing, as indicated by provision of pulse unit 15. This apparatus is further provided with mother liquor collecting means 13, heating unit 14, and product withdrawal line 14a. Purified MVP product is withdrawn by line 14a. Mother liquor, poorer in MVP than product 14a or feed 11, is withdrawn by line 16; a portion can be withdrawn from the process for further utility by valve 17 and line 18. However, I usually prefer to pass all the mother liquor by conduit 19 to conduits 20 and 22. The portion of mother liquor passed by conduit 20 is controlled by valve 21 in an amount such that the resulting concentration in stream 9 is about 75 percent MVP. The remaining mother liquor is passed by valve 23 to feed conduit 1. It should be noted that the mother liquor in conduits 16 and 19 is poorer in MVP content than column feeds 9 and 11 and richer in MVP content than process feed 1. Thus, the portion of this mother liquor returned by conduit 20 to conduit 8 serves to lower the MVP content of the resulting stream 9 as desired in this invention, while the portion returned by conduit 22 to feed 1 serves to enrich the process feed in MVP content.

Although the preceding example, in conjunction with the separation of MVP from a mixture containing it and MEP states the maximum desirable concentration of MVP in the column feed to be about 75 percent, this figure varies with the system being treated. For example, in the purification of para-xylene by the above described fractional crystallization process from a mixture of various isomeric xylenes and ethylbenzene, the maximum desirable column feed purity according to the present invention is about 65 percent para-xylene. The maximum desirable feed purity can readily be ascertained for any given system by routine testing by one skilled in the art and in possession of this disclosure. Although I do not wish to be limited thereto, it is my theory that, because larger crystals are formed with a feedstock of greater purity, refluxing of the advancing crystal mass in the fractional crystallization column by melted crystals is allowed to occur at a greater rate than desirable when feedstocks of too high a purity are processed. Thus, the reflux melt, which is of necessity hotter than the crystal melt, can cause channels through the crystal mass, which decreases the contacting efficiency between the reflux and crystals. Further, it is felt that the larger crystals formed from high purity feedstocks may have more impurities occluded therein. In any event, I have found that column operational stability can be improved by maintaining the concentration of component to be frozen below a predetermined maximum.

Reasonable variation and modification are possible within the scope of the foregoing disclosure, the drawing, and the appended claims to the invention, the essence of which is that a fractional crystallization column can be operated at a more stable state and with greater throughput and/or product purity by maintaining the concentration in the feed of component to be frozen below a predetermined maximum by returning thereto a portion of the column mother liquor.

What is claimed is:

1. In a process for separation of at least one component from a fluid mixture containing it wherein the fluid mixture is cooled to cause a partial freezing thereof, the frozen portion is separated from the fluid portion, the frozen portion is subsequently at least partially melted and then cooled to a higher temperature than the first cooling step to cause partial freezing thereof, the resulting cooled portion is treated in a crystal purification zone by countercurrent contact with melt resulting from reheating therein of said resulting cooled portion, and a portion of mother liquor is withdrawn from said zone subsequent to said contact, the improvement comprising returning at least a portion of said withdrawn mother liquor to said now at least partially melted frozen portion prior to the cooling thereof.

2. A process for separation of a fluid mixture comprising the steps of:
   (a) cooling said mixture sufficient to cause a portion of said mixture to freeze;
   (b) separating the solid from the fluid phase;
   (c) at least partially melting and subsequently recooling the separated solid phase sufficient to cause a portion thereof to freeze;
   (d) passing the resulting partially frozen stream to a crystal purification zone wherein said last-mentioned stream is countercurrently contacted with melt resulting from heating thereof;
   (e) withdrawing a portion of said melt as product of the process;
   (f) withdrawing another portion of said melt subsequent to its countercurrent contact with crystals entering said zone;
   (g) passing one portion of said last-mentioned withdrawn portion to the mixture prior to step (a); and
   (h) passing another portion from step (f) to the process stream immediately prior to step (c).

3. A process for separation of a liquid mixture comprising the steps of passing said mixture to a first chilling zone, cooling said mixture therein to cause at least a partial freezing thereof, withdrawing the partially frozen stream, separating by filtration the liquid from the solid phase, withdrawing the liquid phase as a product of the process, passing the solid phase to a heating zone wherein it is at least partially melted, withdrawing the resulting stream, cooling said resulting stream sufficient to cause at least a partial freezing thereof, passing this partially frozen stream to a pulsed crystal purification zone wherein crystals introduced therein are passed in countercurrent contact with liquid resulting from melting by application of heat crystals which were previously introduced therein, said liquid resulting from melting being urged into countercurrent contact with said crystals introduced therein by periodic application of pressure pulses thereto, withdrawing from said zone a portion of said liquid resulting from melting as a product of the process, withdrawing from said zone subsequent to countercurrent contact with crystals another portion of said liquid resulting from melting, passing a first portion of said another portion into admixture with said liquid mixture, and passing a second portion of said another portion into admixture with said resulting stream.

4. The process of claim 3 wherein said liquid mixture comprises p-xylene and another isomeric xylene, said liquid phase comprises p-xylene and said another isomeric xylene poorer in p-xylene concentration than said liquid mixture, and said a portion comprises p-xylene and said another isomeric xylene richer in p-xylene concentration than said liquid mixture.

5. The process of claim 4 wherein said second portion is sufficient to maintain the composite of said second portion and said resulting stream at a p-xylene concentration below about 65 percent.

6. The process of claim 3 wherein said liquid mixture comprises methylethylpyridine and methylvinylpyridine, said liquid phase is poorer in methylvinylpyridine than said liquid mixture, and said portion is richer in methylvinylpyridine than said liquid mixture.

7. The process of claim 6 wherein said second portion is sufficient to maintain the composite of said second portion and said resulting stream at a methylvinylpyridine concentration below about 75 percent.

8. Fluid purification apparatus comprising a first cooling means, a first separation means adapted to separate solids from liquids, first conduit means adapted to receive a fluid mixture and operatively connected to said first cooling means, second conduit means communicating between said first cooling means and said first separation means, second cooling means, third conduit means adapted to receive separated solids from said first separation means and communicating with said second cooling means, fractional crystallization means comprising an elongated vessel having a liquid permeable wall section at a point intermediate the ends, heating means and liquid withdrawal means at one end, fluid introduction means at the opposite end, liquid receiving means in communication with said liquid permeable wall section, fourth conduit means communicating between said second cooling means and said fluid introduction means, and fifth conduit means communicating between said liquid receiving means and said third conduit means.

9. Apparatus of claim 8 further characterized by sixth conduit means adapted for product withdrawal and communicating with said liquid withdrawal means, seventh conduit means communicating between said fifth and said first conduit means, and heating means associated with said third conduit means.

10. Apparatus of claim 9 further characterized in that said first separation means comprises a filter having associated therewith a liquid removal conduit, and said fractional crystallization means has associated therewith means to apply periodic pressure pulses to the fluid therein.

References Cited in the file of this patent

UNITED STATES PATENTS

| | | |
|---|---|---|
| 2,815,288 | McKay | Dec. 3, 1957 |
| 2,839,411 | Vela | June 17, 1958 |
| 2,940,272 | Croley | June 14, 1960 |

FOREIGN PATENTS

| | | |
|---|---|---|
| 560,424 | Canada | July 15, 1958 |